Sept. 27, 1966     I. M. MILLER     3,275,774
THERMAL PROTECTIVE ARRANGEMENT FOR INDUCTIVE DEVICES
Filed July 19, 1963
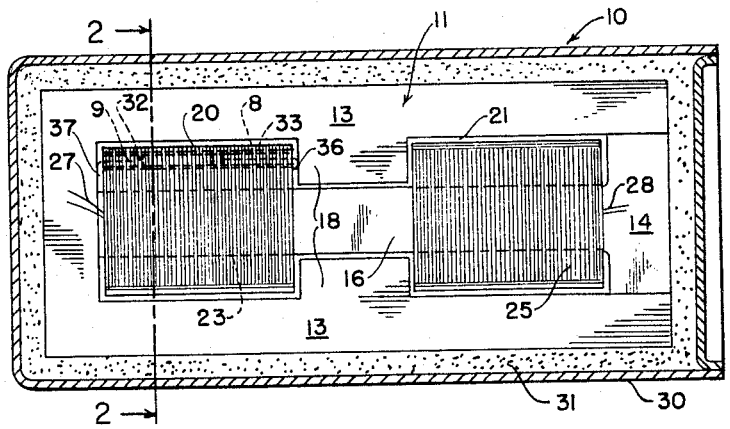
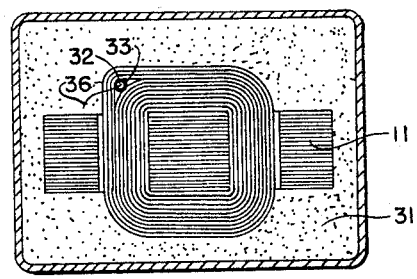
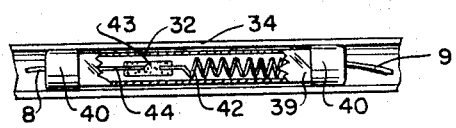
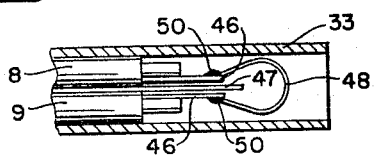
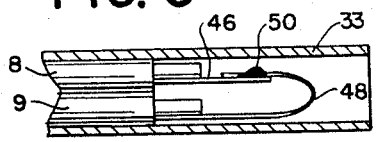
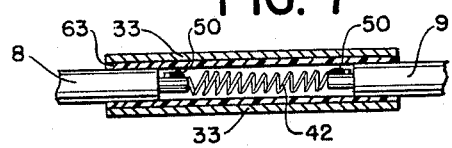
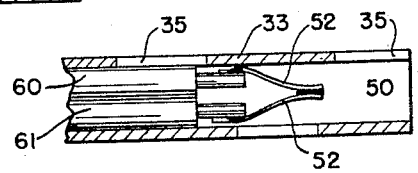
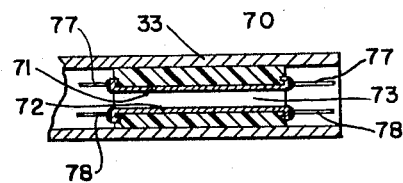
INVENTOR.
IMRICH M. MILLER
BY *Darby & Darby*
ATTORNEY 3,275,774
THERMAL PROTECTIVE ARRANGEMENT FOR INDUCTIVE DEVICES
Imrich M. Miller, Paterson, N.J., assignor to Universal Manufacturing Corporation, Paterson, N.J., a corporation of New Jersey
Filed July 19, 1963, Ser. No. 296,235
5 Claims. (Cl. 200—142)

This invention relates to a heat-sensitive protective arrangement and more particularly to a thermal protective arrangement for use with transformers, chokes and other types of inductive devices.

There are many applications where inductive devices, such as transformers and chokes, are used in which it is desirable to provide protection for the device against excessive operating temperatures.

One such application is where the inductive device is a transformer and it is used as a part of the ballast for a fluorescent lamp. Here, the transformer is desirably protected against high operating temperatures in order to prevent the current carrying windings from burning and also to prevent the leakage out of the ballast housing of the filling material or potting compound which surrounds the transformer.

In order to obtain the desired protection against excessive temperatures, the inductive device is usually provided with a heat sensitive element which is used to sense the operating temperature of the device. The heat sensitive element is often in the form of or controls a fuse or bimetallic switch located in the current carrying circuit of the inductive device so that when the operating temperature exceeds a predetermined safe operating level for the inductive device, the thermal element opens the fuse or activates the bimetallic switch and removes the current from the device. In another type of thermal protective element in use, the element produces a short circuit across the inductive device when an unsafe temperature is sensed. When this occurs, most of the current passes through the short circuit rather than through the winding of the device, so that the winding is not damaged.

The use of thermal protective elements such as those discussed above prevents the inductive device from overheating when abnormal operating temperatures are encountered. By either removing the current from the device or else short circuiting the current around the device, the current carrying winding is prevented from melting and shorting out. Also, the impregnating or potting compound in the device is prevented from melting and leaking out of the housing. The latter is highly undesirable since if compound leaks out from the housing, there is always the danger of this material causing damage to surrounding objects.

In order for the thermal element to provide maximum protection for the inductive device, it should be located in close proximity to or in intimate contact with the current carrying wires. When this is done, the element is extremely sensitive to changes in the operating temperature of the winding and it can react immediately when an abnormal temperature rise occurs. If the thermal sensitive element is located at some distance from the current carrying winding of the inductive device, it is not as sensitive or as responsive to the temperature changes and, in some cases, the inductive device may be damaged during the time lag between an actual temperature rise in the winding and the sensing of this rise and reaction by the thermal element. Therefore, it is highly desirable to place the thermal element as close as possible to the current carrying winding in order to obtain more accurate and faster thermal protection.

A typical inductive device, such as a transformer or choke, has an iron, steel or alloy core or yoke which is usually formed by a plurality of laminations stacked on top of one another and fastened together in a suitable manner. The current carrying winding section is formed by a number of insulated layers of wire or foil which are wound over each other and then are placed over a portion of the core. Output leads are brought out from the winding section to provide connections to the current source or to the load to which the inductive device is to be connected.

During the manufacture of inductive devices of this type, after the winding section has been placed on the core, the complete core and winding assembly is placed in a high temperature bath where it is impregnated with varnish, shellac, or other type of compound. This is done for the purpose of reducing the audio frequency hum between the windings and the laminations and to impart other desirable characteristics to the device. It is generally undesirable to connect the thermal sensitive element to any part of the inductive device before the device is immersed in the impregnating bath, since, if this is done, the thermal element will have to have a critical melting temperature which is at least higher than the temperature of the impregnating bath. If the temperature at which the thermal sensitive element is to react is to be below or near the temperature of the bath, then the element would either open or short when the device was placed in the bath. Of course, this means that thermal protection cannot be provided at operating temperatures lower than the bath temperature if the thermal element is to be connected before the bath.

In order to overcome this drawback, the thermal sensitive element is usually connected to the inductive device after it has been taken out of the bath. However, since the element is not connected to the inductive device until after the bath, it must be located at a position ouside of and remote from the current carrying windings. Otherwise, it would be necessary to disturb or open the windings to place the element therein. This is highly impractical and if it were done it would add greatly to the cost of manufacturing the device.

In one arrangement currently in use, the thermal protective element is connected after the impregnating bath and is located outside the winding adjacent both the metallic core and the winding. As discussed above, this arrangement has a disadvantage in that the thermal element has reduced sensitivity and response to the actual operating temperature conditions existing in the winding. This is so because some of the heat in the winding is dissipated or conducted, radiated or carried away by convection before it reaches the thermal element. Another disadvantage also arises in this arrangement since the thermal element is now exposed to the potting compound which is poured around the device. This plotting compound is of asphaltic composition and it must be poured while it is hot. Therefore, in order to prevent the thermal element from being melted by the potting compound the temperature of the compound must be lower than the critical temperature of the element. This again may result in the use of thermal protectors which do not have a low enough critical temperature or in the use of a potting compound which must be kept at a relatively low temperature. Both results impose unnecessary and undesirable limitations on the manufacture of the devices.

All of the above disadvantages are overcome by the present invention in which a thermal protective arrangement is provided which is both practical in construction and highly sensitive to operating temperature changes occurring within the device. In accordance with the invention, the thermal sensitive element is located within the current carrying winding of the inductive device, but it is not placed in the device until after the impregnating bath has been completed. This is accomplished without cutting or otherwise disturbing the windings of the device after the bath by placing a holder, such as a tube, between the layers of the winding where the thermal protective element is to be located, during the manufacture of the winding. During the manufacture of the winding, leads are also brought out from the winding for connection at a later time to the thermal protective element. After the winding or windings have been placed on the core, there being no thermal protective element in the holder at this time, the core and winding assembly is placed in the impregnating bath. After the device is taken out of the bath, the protective element is placed in the holder and connected in the circuit in the desired manner.

This novel construction of the present invention has several advantages. First of all, since the thermal protective element is not subjected to the heat of the impregnating bath, it can be selected to have any desired critical temperature which, for example, may be lower than the temperature of the bath. Also, since the thermal protective element is located within the winding, it is extremely sensitive to any changes in the operating temperature of the winding. Further, since the element is not directly exposed to the potting compound, a hotter compound or a lower critical temperature for the element may be used. All of these advantages are obtained by using a structure which adds relatively little to the total manufacturing cost of the inductive device since the holder is relatively inexpensive and the thermal protector is inserted and connected in a simple manner.

It is, therefore, an object of this invention to provide a thermal sensitive protective element for use with an inductive device.

Another object of the invention is to provide a thermal protective element which is located within the current carrying windings of an inductive device, and is sensitive to the operating temperature therein.

Still a further object of the invention is to provide a thermal protective element for an inductive device such as a transformer in which the element is located in a tube or holder within the layers of the transformer winding.

It is a further object of the invention to provide an inductive device, such as a transformer or choke, having a fuse holder located within layers of its current carrying winding and a thermal sensitive fuse within this holder.

Other objects and advantages of the present invention will become more apparent upon reference to the following specification and annexed drawings in which:

FIGURE 1 shows a top plan view, partially cut-away, of a transformer using the present invention;

FIGURE 2 is a side-elevational view of the transformer of FIGURE 1 taken in section along lines 2—2 of FIGURE 1;

FIGURES 3–7 shows various types of thermal sensitive fuses which may be used with the present invention; and FIGURE 8 shows a thermal sensitive shorting element which may be used with the present invention.

Referring to FIGURES 1 and 2, an inductive device with which the present invention is used is shown as the transformer 10. The transformer includes a core 11 which is formed by a number of stacked laminations (see FIGURE 2). As illustratively shown, the core 11 is of the shell type, having top and bottom frame pieces 13, side legs 14, and a center winding leg 16. Also, as illustratively shown, the core has two magnetic shunts 18 which separate portions of the core to form two windows 20 and 21. It should be recognized, of course, that the present invention may be utilized with any type of core construction having any number of windings or winding sections thereon and with any type of transformer or other inductive device made with or without a core.

The transformer 10 has a primary winding 23 which is placed over the center leg 16 and located in the window 20 and a secondary winding 21 located in the window 21 which is also placed over the center winding leg 16. The two windings 23 and 25 may be connected in autotransformer relationship (not shown), or just the normal transformer inductive coupling action may be utilized. The primary winding 23 has leads 27 which are to be connected to the source of alternating current (not shown) which is to power the transformer. The secondary winding 25 has output leads 28 which are to be connected to the transformer load (not shown).

The whole transformer assembly is located within an outer housing 30 and the space between the core 11 and the housing is filled with a potting compound 31 which is preferably of an asphaltic composition similar to pitch. The potting compound is used to reduce noise. If desired, other elements may also be located within the housing.

As shown in FIGURES 1 and 2, a thermal protective device 32 is located within a holder 33 which is placed between several of the layers of the winding 23. In a preferred form of the invention, the thermal sensitive element 32 is provided with the leads 8 and 9 at each end thereof. Where the thermal sensitive element 32 is of the fuse type, which opens the electrical circuit upon the occurrence of an abnormally high operating temperature, the primary winding 23 is broken during the manufacturing process at a certain point and two leads 36 and 37 are brought out to be connected to the element 32. In one form of the invention, the winding leads 36 and 37 are connected to the leads 8 and 9 on the element. Of course, if desired, the leads 36 and 37 may be directly connected to the element 32 and the leads 8 and 9 may be omitted. Where the thermal sensitive element is of the shorting type its leads are connected to the two primary leads 27.

It is not normally necessary to provide the secondary section with a thermal sensitive element since once the primary section is either opened or shunted, the secondary section will be automatically protected. Of course, situations may exist where the secondary is to be protected also and in this event the holder 33 and element 32 are provided in the secondary in the same manner.

The usual procedure in manufacturing the primary winding 23, is to wind a plurality of such windings on a single bobbin and then cut the bobbin to separate the individual windings. Where the holder 33 is to be placed within the winding, the winding process is stopped at the selected winding layer and the holder 33 is then placed in the winding on this layer. The holder may be located between any two layers of the winding as desired. In a preferred form of the invention, the holders 33 are made from a single continuous hollow rod which is placed between the same layers of each of a plurality of windings that are being made at the same time. After or before the rod is in place, each of the windings being made is broken at the desired point and the two leads 36 and 37 are brought out. When the rod is in place, the winding process is resumed and the desired number of additional layers are wound over the rod to hold it snugly in place.

After the actual winding process is completed, the various windings on the bobbin are separated from each other and the continuous rod is cut to form the individual holders 33 for each winding. Therefore, each of the holders is of the same length as the winding. If desired, separate holders 33 of any desired size may be placed in each of the windings on the bobbin when a number of windings are being made at the same time. However, this is not as efficient as using a single continuous rod which is later cut up when the windings are separated from the bobbin. Of course, where only one or a few windings are made at one time, the individual holders may be precut.

As shown in FIGURE 2, the holder 33 is of generally circular construction. It should be recognized, of course, that any other shape holder may be utilized, for example, square, triangular, etc. In a preferred form of the invention, the holder 33 is located at one corner of the winding since the greatest amount of free space is available at this point and the holder 33 makes the smallest bulge on the winding here. It should be recognized, of course, that any shape holder may be used and this holder may be located at any desired place within the winding.

The material for the holder 33 may be of any suitable type which is capable of withstanding the temperature of the impregnating bath. Suitable materials are, for example, cardboard, nylon, Teflon, plastic materials, etc. The material for the holder 33 is preferably of the insulating type, so that it will not interfere with the operation of the transformer current carrying windings. If desired, the length of the holder may be partially open as shown by the semi-cylindrical holder 34 of FIGURE 3 or else holes or slits 35 as shown in FIGURE 6 may be provided to permit the air within the winding to come into contact with the thermal sensitive element 32 when it is placed within the holder. In any event, the holder 33 or 34 is still placed within the winding during the time that the winding is being made.

After the winding sections have been completed, they are placed on the center leg 16 of the core 11 and the core is then fastened together by nuts and bolts, clamps, press fit, etc. The core and the winding sections are then placed in an impregnating bath (not shown) where the varnish or shellac is applied under pressure. At this point, in the present invention, there is no thermal sensitive element within the holder 33 and the impregnating bath is carried out in the normal manner at any suitable temperature.

After the transformer is removed from the impregnating bath, the thermal sensitive element 32 is slipped between the two winding layers adjacent the holder 33 and placed within the holder. Connections are then made between the winding leads 36 and 37 and the element leads 8 and 9 in the desired manner. The complete transformer assembly, including the thermal sensitive element, is then placed within the housing 30 and the potting compound 31 is applied. It should be recognized that the potting compound 31 cannot come directly into contact with the thermal sensitive element since it is protected both by the holder 33 and by the layers of the transformer winding 23 which cover it. However, in the location shown, the thermal sensitive element is extremely sensitive to any temperature changes of the winding since it is intimately located with respect thereto.

FIGURE 3 shows a conventional type of thermal sensitive fuse which may be used in the invention to open the circuit for the current carrying winding. The fuse has a glass envelope 39 and metallic end caps 40. One end of a spring 42 is electrically connected to one of the end caps and the other end of the spring is connected to one end of a thermal sensitive element, which is, for example, a metal alloy piece 43 which has a predetermined melting temperature. Many such alloys are well known in the art for melting at a predetermined temperature and these alloys, or their general shapes, in themselves, form no part of the present invention. A contact lead 44 is connected from the other end of the alloy piece 43 to the other end cap 40. The fuse leads 8 and 9 are connected to the respective winding leads 36 and 37. When the critical melting temperature of the alloy piece 43 is reached, it melts and the spring 42 relaxes. This breaks the circuit and removes the current from the transformer winding, thereby preventing any further overheating.

FIGURE 4 shows another type of a thermal sensitive element which may be used in the present invention. Here, the two leads 8 and 9 preferably have an insulating coating and a metallic contact 46 is connected by soldering, welding or crimping to the uninsulated end of each of the leads. An insulated spacer 47 is also provided between the two contacts 46 in order to prevent shorting therebetween which would defeat the purpose of the thermal sensitive fuse. A spring 48 is fastened to each of the contacts 46 by an amount of a temperature sensitive alloy 50, such as solder. When the critical melting temperature for the alloy 50 is reached, the alloy melts and the spring 48 is released and flexes away from contact with the two members 46. This breaks the circuit connection in the winding of the transformer. It should be understood that the fuse of FIGURE 4 is located within the holder 33 or 34 and is placed therein and connected in the winding circuit after the transformer is taken out of the impregnating bath.

FIGURE 5 shows another type of thermal sensitive fuse which is similar to the one shown in FIGURE 4, except that one end of the spring 48 is connected directly to the uninsulated end of lead 9 and only one contact element 46 is provided which is connected to the lead 8. The other end of the spring 48 is electrically connected to the element 46 by the temperature sensitive alloy 50. As before, when the critical temperature is reached, the alloy 50 melts and the spring 48 flexes away from the contact 46 thereby opening the circuit.

FIGURE 6 shows another type of fuse in which two spring members 52 are connected, for example, by welding or crimping, to the uninsulated ends of the leads 8 and 9. The unconnected ends of the spring members 52 are fastened together by the alloy 50. Here again, when the critical temperature is reached, the alloy 50 melts and the two spring members move apart thereby breaking the circuit connection.

FIGURE 7 shows still another embodiment of thermal sensitive fuse which may be utilized. Here, the leads 8 and 9 are made of a suitable plastic material such as polyvinyl-chloride and a stiff sleeve 63, which is preferably made of nylon or other suitable material, is provided. A spring 42 is connected to the uninsulated ends of the leads 8 and 9 by the temperature sensitive alloy 50. The spring is placed under tension within the sleeve 63, and the insulated portions of the leads 8 and 9 are heat sealed or crimped to the sleeve. The electrical connection to the winding runs through the lead 8, the spring 42 and the lead 9. When the critical temperature of the alloy is reached, one or both ends of the spring 42 separate from the leads 8 or 9 thereby breaking the electrical connection to the winding.

In any of the embodiments of the invention shown in FIGURES 4, 5, 6 or 7, the additional leads 8 and 9 for the thermal sensitive fuse may be eliminated and connections made directly to the winding leads 36 and 37. Here, the leads 36 and 37 would be provided with insulating sleeves at the places where there would be a possibility of the leads shorting together, for example, within the holder 33 or 34. The connections for the various contacts 46, spring members 48, and springs 42 are made as described before.

FIGURE 8 shows an arrangement for shorting the winding when the critical temperature has been reached. Here, a thermal sensitive element 70 is provided which is made of a suitable insulating material such as plastic. The element 70 has two metal conducting members 71 and 72 located and sealed within its body, preferably with a space 73 therebtween. Each member 71 and 72 has a respective lead 77 and 78 at each end thereof. In using this element, both primary leads 27 are cut and electrical connection is made by connecting the ends of one of the primary leads 27 to the leads 77 and the ends of the other primary lead 27 to the lead 78. The element 70 is placed within the holder previously described. When the melting temperature of the element 70 is reached, the two members 71 and 72 are released and come into contact with each other to short out the winding 23.

While the various embodiments of the invention have been shown as using a fuse-type thermal sensitive element, it should be recognized that a bimetallic switch may readily be substituted for the fuse. The bimetallic switch would open the circuit in response to sensing the predetermined high temperature and close it after the temperature dropped. This would provide intermittent operation of the inductive device and indicate that something was wrong in the circuit thereby giving the opportunity to remove power from the circuit and correct the defect.

It should also be understood that where a multiple winding inductive device is used that a thermal protector may be located in each such winding. Therefore, if there were a plurality of primary and/or secondary windings on a single core, the thermal protective device in any one winding would only disable that winding and connected circuit and the other windings would operate in the normal manner until their thermal protective devices were also actuated.

The principles of the present invention can also be used with the type of fuse shown in my copending application S.N. 264,389 entitled, "Electrical Fuse," and filed on March 11, 1963. The fuse shown there is formed by the resilient ends of two wires held together by a quantity of a heat sensitive material which melts upon sensing a predetermined temperature to break the electrical circuit. That type of fuse, with or without an insulating envelope, may be placed between transformer windings in accordance with the devices shown in the present invention.

Therefore, it can be seen that a novel thermal protective arrangement has been provided for a transformer, choke or other type of inductive device. The protective arrangement is relatively simple to construct and is extremely sensitive to temperature variations within the inductive device. Also, since the thermal sensing element is not subjected to the heat of the impregnating bath or the potting compound, its critical melting temperature can be selected to be below the temperature of either the bath or the compound, or both.

While preferred embodiments of the invention have been described above, it will be understood that these are illustrative only, and the invention is limited solely by the appended claims.

What is claimed is:

1. A thermal protective arrangement comprising in combination: an inductive device including a winding for carrying electric current formed by a number of superposed layers of wire, a holder having at least a portion thereof buried between two adjacent layers of said winding, a thermal sensitive electrical fuse element operative at a predetermined critical temperature located within said holder and having its thermal sensitive portion completely surrounded by the layers of said winding and in heat sensing relationship therewith for sensing the operating temperature of the winding, said holder having a portion in direct contact with said windings and lying adjacent the thermal sensitive portion of said fuse element to convey heat from said windings to said fuse element at least partially by conduction, said holder also being formed with an open section substantially along its length to permit convection of the winding heat to said fuse element, and means electrically connecting said winding in series with said fuse element for modifying the winding when the fuse senses said critical temperature.

2. A thermal protective arrangement comprising in combination: an inductive device including a winding for carrying electric current formed by a number of superposed layers of wire, a holder having at least a portion thereof buried between two adjacent layers of said winding, a thermal sensitive electrical fuse element operative at a predetermined critical temperature located within said holder and having its thermal sensitive portion completely surrounded by the layers of said winding and in heat sensing relationship therewith for sensing the operating temperature of the winding, said holder having a portion in direct contact with said windings and lying adjacent the thermal sensitive portion of said fuse element to convey heat from said windings to said fuse element at least partially by conduction, said holder also being formed with a plurality of openings to permit convection of the winding heat to said fuse element, and means electrically connecting said winding in series with said fuse element for modifying the winding when the fuse senses said critical temperature.

3. A thermal protective arrangement comprising in combination: an inductive device including a winding for carrying electric current formed by a number of superposed layers of wire wrapped around and over each other and which are exposed during winding at at least one edge thereof, a holder having at least a portion thereof buried between two adjacent layers of said winding and formed with an opening at at least one end thereof, a thermal sensitive electrical fuse element operative at a predetermined critical temperature located within said holder and having its thermal sensitive portion completely surrounded by the layers of said winding and in heat sensing relationship therewith for sensing the operating temperature of the winding, and means electrically connecting said winding in series with said fuse element for modifying the winding when the fuse senses said critical temperature, said electrical connecting means including a pair of leads connected in series with said winding and said fuse, at least one of said leads brought out through an opening in said holder and through said exposed edge of said wire, each lead having an insulated portion and an uninsulated portion, said fuse including a spring member, an amount of a temperature sensitive alloy for connecting each end of said spring member to the uninsulated portion of a respective lead, a sleeve overlaying said spring and said insulated portion of each of said leads, said spring being held under tension and said sleeve being fastened to the insulated portion of each of said leads to prevent movement of the leads relative to each other.

4. A thermal protective arrangement as set forth in claim 3 wherein the insulated portions of said wire are made of a plastic material and the sleeve is nylon.

5. A thermal sensitive fuse as set forth in claim 4 wherein said insulated portion of each said lead is of polyvinyl chloride, said sleeve is nylon, and said sleeve and insulated portions are fused together by heat.

References Cited by the Examiner

UNITED STATES PATENTS

| | | | |
|---|---|---|---|
| 1,380,493 | 6/1921 | Nissen | 200—142 |
| 2,004,773 | 6/1935 | Sonn | 200—142 |
| 2,566,648 | 9/1951 | Worsham | 200—118 |
| 2,791,660 | 5/1957 | Sims et al. | 200—117 |
| 2,956,210 | 10/1960 | Yatsushiro | 317—5 |
| 3,116,437 | 12/1963 | Harvey | 317—15 |
| 3,127,531 | 3/1964 | Tothero | 310—68.3 |
| 3,130,479 | 4/1964 | Pleiss | 29—155.5 |

FOREIGN PATENTS

| | | |
|---|---|---|
| 559,725 | 8/1957 | Belgium. |
| 642,808 | 6/1962 | Canada. |
| 271,944 | 3/1926 | Great Britain. |

BERNARD A. GILHEANY, *Primary Examiner.*

ROBERT K. SCHAEFER, *Examiner.*

H. B. GILSON, *Assistant Examiner.*